United States Patent
Kumawat et al.

(10) Patent No.: US 10,902,486 B2
(45) Date of Patent: Jan. 26, 2021

(54) METHOD FOR MANAGING PAYMENT VEHICLE DATA BASED ON LOCATION INFORMATION

(71) Applicant: MASTERCARD INTERNATIONAL INCORPORATED, Purchase, NY (US)

(72) Inventors: Jaipal Singh Kumawat, Rajasthan (IN); Hemant Arora, Haryana (IN); Gurpreet Atwal, Somers, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1076 days.

(21) Appl. No.: 15/381,657

(22) Filed: Dec. 16, 2016

(65) Prior Publication Data

US 2017/0178112 A1 Jun. 22, 2017

(30) Foreign Application Priority Data

Dec. 18, 2015 (SG) .......................... 10201510469R

(51) Int. Cl.
*G06Q 40/00* (2012.01)
*G06Q 30/04* (2012.01)

(52) U.S. Cl.
CPC .......... *G06Q 30/04* (2013.01); *G06Q 40/00* (2013.01)

(58) Field of Classification Search
CPC ......... G06Q 40/00; G06Q 20/10; G06Q 30/04
See application file for complete search history.

(56) References Cited

U.S. PATENT DOCUMENTS

| | | | | |
|---|---|---|---|---|
| 8,928,495 B2 * | 1/2015 | Hassib | .................... | G06F 17/00 340/933 |
| 2011/0161116 A1 * | 6/2011 | Peak | ..................... | G01C 21/36 705/4 |
| 2012/0323772 A1 * | 12/2012 | Michael | ................. | G06Q 40/00 705/39 |
| 2014/0036077 A1 * | 2/2014 | Nerayoff | .................. | G06K 9/00 348/148 |
| 2014/0149148 A1 * | 5/2014 | Luciani | .................. | G06Q 40/08 705/4 |
| 2014/0236638 A1 * | 8/2014 | Pallesen | ................. | G06Q 40/08 705/4 |

OTHER PUBLICATIONS

Franke, Uwe & Gavrila, Dariu & Gorzig, Steffen & Lindner, Frank & Paetzold, Frank & Wohler, Christian, Autonomous Driving Goes Downtown., Nov. 1998, IEEE Intelligent System, 1-13 (Year: 1998).*

* cited by examiner

*Primary Examiner* — I Jung Liu
(74) *Attorney, Agent, or Firm* — Harness, Dickey & Pierce, P.L.C.

(57) ABSTRACT

A method for managing payment vehicle data based on location information is provided. The method includes receiving at least one payment vehicle attribute of at least one payment vehicle, receiving location information specifying a geographical location for use of the at least one payment vehicle, retrieving payment vehicle data from one or more databases based on the at least one payment vehicle attribute, filtering the payment vehicle data using the location information, to exclude data that is not applicable to the geographical location, and displaying the filtered payment vehicle data to the user.

18 Claims, 5 Drawing Sheets

METHOD FOR MANAGING PAYMENT VEHICLE DATA BASED ON LOCATION INFORMATION

CROSS-REFERENCE TO RELATED APPLICATION

This application claims the benefit of and priority to Singapore Patent Application No. 10201510469R, filed Dec. 18, 2015. The entire disclosure of the above application is incorporated herein by reference.

FIELD

The present disclosure relates broadly, but not exclusively, to methods and systems for managing payment vehicle data.

BACKGROUND

This section provides background information related to the present disclosure which is not necessarily prior art.

Over the last few decades electronic and physical transactions have increasingly involved the use of physical credit cards and the details of physical credit cards. More recently, transactions have moved towards the use of a smartphone app or an online portal. Also, it is common for a user to retain a plurality of payment vehicles such as credit cards.

Each of the payment vehicles has a card usage policy, such as corporate/personal, international/domestic, etc. Also, each payment vehicle has its own terms and conditions. In addition, there may be offers/discounts available for a payment vehicle of which the user is unaware. This is particularly the case on occasions where the user is travelling internationally and may be unfamiliar with offers or discounts applicable to the region in which they are travelling.

Due to the volume and complexity of payment vehicle data (e.g. usage policies, terms & conditions and offers attached to a particular payment vehicle) for each payment vehicle, it can be difficult for a user to understand that information, and to recall or locate it when overseas. Furthermore, it is difficult for the user to be made aware, and kept aware, of offers available to them at particular times and in particular countries or regions.

After usage of a payment vehicle, a user can face difficulty with regard to managing payment vehicle data, such as locating each transaction. There are a number of contributing factors to this difficulty. These include the transactions in the purchase history not being listed in chronological order due to differences in clearance terms for each merchant, payment scheme, issuer and country or region. Also, the user can often forget details of transactions, particular when making large numbers of transactions.

A need therefore exists to provide methods and systems for managing payment vehicle data that seeks to address the above-mentioned problems.

SUMMARY

This section provides a general summary of the disclosure, and is not a comprehensive disclosure of its full scope or all of its features. Aspects and embodiments of the disclosure are also set out in the accompanying claims.

According to a first aspect of the present disclosure, there is provided a method for managing payment vehicle data based on location information is disclosed. The method includes receiving at least one payment vehicle attribute of at least one payment vehicle, receiving location information specifying a geographical location for use of the at least one payment vehicle, retrieving payment vehicle data from one or more databases based on the at least one payment vehicle attribute, filtering the payment vehicle data using the location information, to exclude data that is not applicable to the geographical location, and displaying the filtered payment vehicle data to the user.

According to a second aspect of the present disclosure, there is provided a method for managing payment vehicle data based on location information. The method includes receiving at least one payment vehicle attribute of at least one payment vehicle, retrieving payment vehicle data from one or more databases based on the at least one payment vehicle attribute, analysing the payment vehicle data to obtain location information specifying a geographical location used by the at least one payment vehicle, filtering the payment vehicle data using the location information, to exclude data that is not applicable to the geographical location, and displaying the filtered payment vehicle data to the user.

According to a third aspect of the present disclosure, a computing system for managing payment vehicle data based on location information is disclosed. The computing system includes, location information receiver for specifying a geographical location for use of the at least one payment vehicle, and a payment vehicle data manager for retrieving payment vehicle data from one or more databases based on at least one payment vehicle attribute, and filtering the payment vehicle data using the location information, to exclude data that is not applicable to the geographical location, and a display for displaying the filtered payment vehicle data to the user.

According to a fourth aspect of the present disclosure, a computing system for managing payment vehicle data based on location information is disclosed. The computing system includes a receiver for receiving at least one payment vehicle attribute of at least one payment vehicle, a payment vehicle data manager for retrieving payment vehicle data from one or more databases based on at least one payment vehicle attribute, analysing payment vehicle data to obtain a location information for specifying a geographical location used by the at least one payment vehicle, and filtering the payment vehicle data using the location information, to exclude data that is not applicable to the geographical location, and a display for displaying the filtered payment vehicle data to the user.

According to a fifth aspect of the present disclosure, there is provided a system for managing payment vehicle data based on location information. The system includes a computer. The computer includes at least one processor, and at least one memory including computer program code. The at least one memory and the computer program code configured to, with at least one processor, cause the computer at least to receive at least one payment vehicle attribute of at least one payment vehicle, receive location information specifying a geographical location for use of the at least one payment vehicle, retrieve payment vehicle data from one or more databases based on the at least one payment vehicle attribute, filter the payment vehicle data using the location information, to exclude data that is not applicable to the geographical location, and display the filtered payment vehicle data to the user.

According to a sixth aspect of the present disclosure, a computer readable medium including computer program code is disclosed. The computer readable medium is configured to, with at least one processor, cause a computer at least to receive at least one payment vehicle attribute of at least one payment vehicle, receive location information specifying a geographical location for use of the at least one payment vehicle, retrieve payment vehicle data from one or more databases based on the at least one payment vehicle attribute, filter the payment vehicle data using the location information, to exclude data that is not applicable to the geographical location, and display the filtered payment vehicle data to the user.

Unless context dictates otherwise, the following terms will be given the meaning provided here:

"payment vehicle" includes a credit card, debit card, virtual card, bank account or any other means from which funds can be debited to affect a transaction;

"payment vehicle attributes" are any credentials necessary to affect a transaction. For a credit card, for example, the credentials may include a credit card number, account number, card or account balance, expiry date and so forth;

"payment vehicle data" refers to any information stored in the system of a financial institute, such as an issuer or acquirer, which maintains information of the payment vehicle and/or the user of the payment vehicle. For a credit card, for example, the data may include a usage policy corporate/personal, international/domestic, etc. The data may also include whether or not international usage of the card is allowed, and terms & conditions of usage. The payment vehicle data may also include transaction history of the payment vehicle, such as purchase records with types of purchased article, place of transactions etc.

"ancillary information" refers to any information used for the purpose of merchandising activities, such as advertisements, discounts and offers. For example, the information may include offers on hotel accommodations, restaurants, tourism places and activities, cab facilities, shopping, travel insurance, promotion information, etc.

"one or more databases" refers to any databases located within a computing system or remote server, such as a server of financial institutes or cloud. The databases may be a cloud database that runs on a cloud computing platform.

Further areas of applicability will become apparent from the description provided herein. The description and specific examples and embodiments in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. With that said, embodiments of the disclosure will be better understood and readily apparent to one of ordinary skill in the art from the following written description, by way of example only, and in conjunction with the drawings, in which.

DETAILED DESCRIPTION

Figure 1:
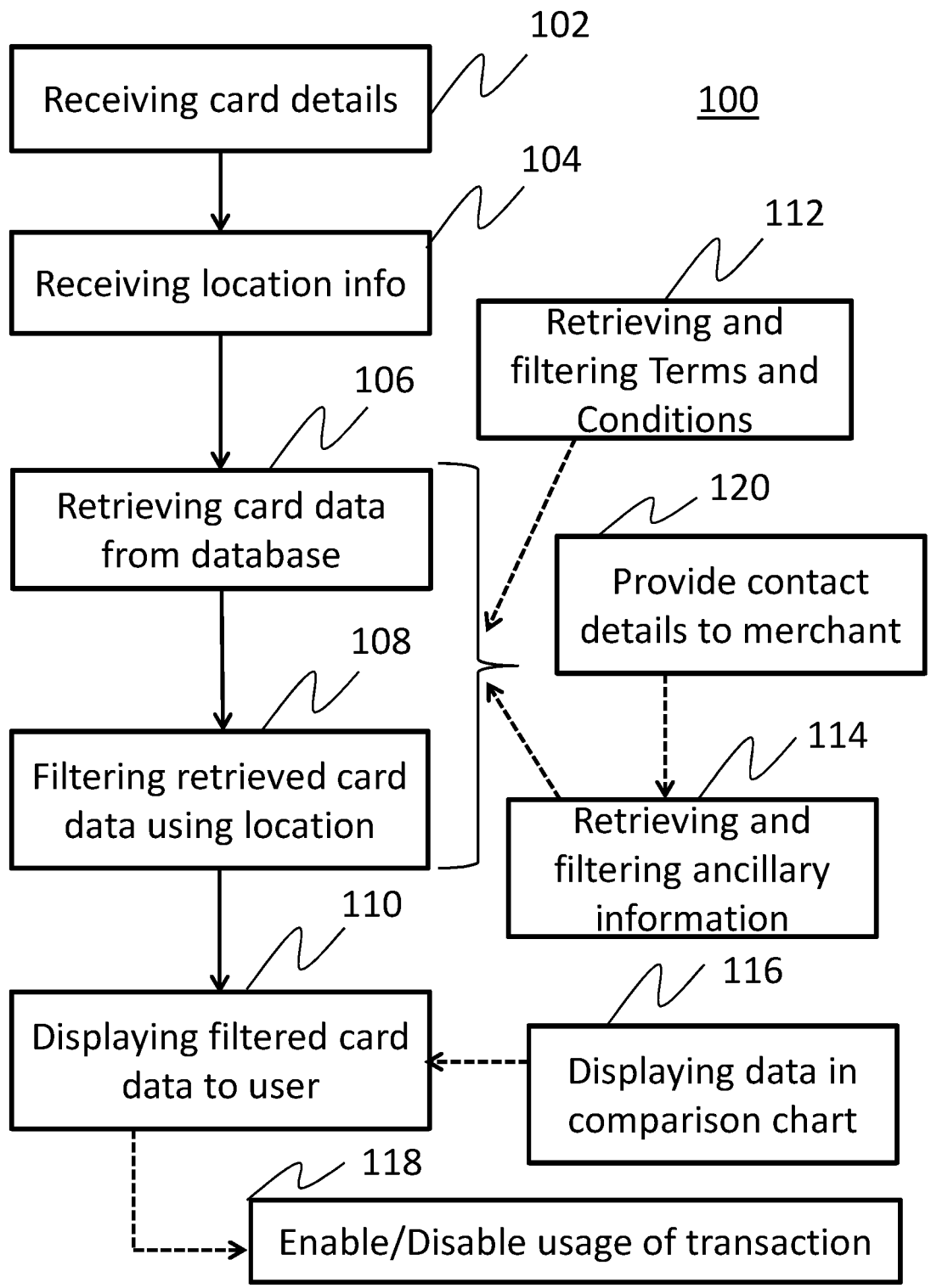
FIG. 1 shows a flow chart illustrating a method for managing payment vehicle data based on location information according to present teachings.

Embodiments of the present disclosure will be described, by way of example only, with reference to the drawings. The description and specific examples included herein are intended for purposes of illustration only and are not intended to limit the scope of the present disclosure Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "retrieving", "filtering", "providing", "displaying", "analysing", "enabling", "disabling" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium, such as exemplified in the Internet system, or wireless medium, such as exemplified in the GSM mobile telephone system. The computer program when loaded and executed on such a computer effectively results in an apparatus that implements the steps of the preferred method.

FIG. 1 shows a flow chart illustrating a method 100 for managing payment vehicle data based on location information, according to an embodiment of the disclosure. The method 100 may be performed by a computer that is coupled to one or more databases. Furthermore, the method 100 may be performed by a computing device which may be a mobile device (e.g. a smart phone or tablet computer) or a personal computer. Further details on the computer and databases will be provided below with reference to FIGS. 4 and 5.

The method 100 broadly comprises:
Step 102: receiving at least one payment vehicle attribute of at least one payment vehicle;
Step 104: receiving location information specifying a geographical location for use of the at least one payment vehicle;
Step 106: retrieving payment vehicle data from one or more databases based on the at least one payment vehicle attribute;
Step 108: filtering the payment vehicle data using the location information, to exclude data that is not applicable to the geographical location; and
Step 110: displaying the filtered payment vehicle data to the user.

Without loss of generality, the description will largely focus on embodiments of the disclosure relating to credit cards, though it will be understood to apply equally to debit cards or other payment vehicles.

Step 102 involves receiving payment vehicle attributes. Payment vehicle attributes may be received by an app stored on a mobile device, by an automatic teller machine (ATM) interface, through a web interface or by any other appropriate means. The payment vehicle attributes can be acquired by scanning the magnetic stripe of a credit card using a magnetic stripe reader, thereby obtaining the card number, expiry date, name of card holder, card issuer, acquirer, country of issuance and other attributes. Alternatively, card attributes can be obtained by wirelessly scanning an integrated circuit (IC) chip embedded on a credit card using an IC chip card reader. It is also possible to manually type card details into a smartphone or automatic teller machine (ATM). Also, card attributes may be saved in one or more databases and retrieved by request, after verification, through a website or in software.

Where a smartphone app is being used, the details may be automatically received from a digital wallet stored on the same smartphone, which wallet may contain several payment vehicles. Similarly, an ATM may automatically gather payment vehicle details for all payment vehicles associated with a particular user, from a server of a financial institution. Thus, while details of payment vehicles may be individually received, details of several payment vehicles may instead be concurrently loaded into the app or portal, and a single payment vehicle can be used (e.g. by the issuer of that payment vehicle) to retrieve details of additional payment vehicles associated with the same user (i.e. inputting a user's credit card number may result in retrieval of all credit card numbers for that user from one particular issuer).

Step 104 may include receiving location information specifying a geographical location for use of the at least one payment vehicle. The location information may be received by an app stored on a mobile device, by an ATM interface, through a web interface or by any other appropriate means. The location information may be a current location of the user for immediate use of the at least one payment vehicle, or a future or 'intended' location of the user for future use of the at least one payment vehicle. The current location may be obtained from a geolocation sensor, or information of a base station for mobile telecommunication, etc. The future location may be obtained from travel planning correspondences, such as a booking confirmation for airline travel, accommodation and travel agency itineraries. Alternatively, the future location may be obtained from travel related transactions of the payment vehicles (e.g. purchase of travel insurance for a particular jurisdiction). This step will be discussed in detail together with FIG. 2.

The location information may specify a particular country of use, or intended use, of the payment vehicle. The location information may similarly specify a region, such as Europe, a city, or even a limited radius about the current position of a smartphone (where GPS is used) and thus about the person holding the smartphone.

Step 106 involves using at least one payment vehicle attribute received in Step 102 as the basis for retrieving payment vehicle data from database. Payment vehicle attributes received in step 102 include a financial institute, such as the issuer of the payment vehicle, the type of payment vehicle (e.g. credit card, debit card, ATM card) and the level of the payment vehicle (e.g. Bronze card, Silver card, Gold card, Platinum card, Black card and Titanium card). By using attributes of payment vehicle, such as credit card details, an app stored on mobile device, ATM or online portal may retrieve payment vehicle data from the system of a financial institute, such as the payment vehicle issuer. If payment vehicle attributes for multiple payment vehicles are received in Step 102, payment vehicle data for each of the multiple payment vehicles may be retrieved from each of the relevant financial institutes.

The payment vehicle data may be retrieved by an app stored on a mobile device, by ATM interface, through a web interface or by any other appropriate means. The retrieving step may be initiated by explicit input by the user through, e.g. an app stored on a mobile device. The retrieving step may be initiated automatically without any explicit input by the user. The payment vehicle attributes may enable access to a system of the issuer via an Application Programming Interface (API) supported by the issuer.

The payment vehicle data may include international (i.e. overseas) usage of the payment vehicle. The user will be able to see the status of the international (i.e. overseas) usage on the payment vehicle within the App or online portal by retrieving payment vehicle data from a system of a financial institute. Also, the payment vehicle data may include the type of card, such as corporate or personal. Based on the type of card, more appropriate information can be provided to the user. For example, an offer for hotel with facilities for business use may be provided to the user of the payment vehicle with corporate type card. On the other hand, an offer for hotels with facilities for entertainment or leisure activities may be provided to the user of the payment vehicle with personal type card.

Alternatively, the payment vehicle data may include a transaction history of the payment vehicle, such as purchase records with types of purchased articles, place of transactions, etc. In one example, the place of transaction in the payment vehicle data may be used for location information received in step 104. In other words, step 104—receiving location information—may be conducted after step 106—retrieving payment vehicle data from database.

Step 108 involves filtering card data retrieved in step 106 using location information received in step 104. The step 108 can be conducted prior to retrieving payment vehicle data of step 106. In that case, the card data filtered in step 108 is retrieved in step 106. By using location information, location specific payment vehicle data is obtained in this step. The step also includes excluding payment vehicle data which is irrelevant to the specified location. Thus, advantageously, the user is not presented with information which is not relevant to the location of usage for the user. The filtering process is conducted based on country, city, address, a geographical location or any other type of location. It is also possible to pick up, for example, payment vehicle data addressed within a predetermined and/or selectable distance from the current location of the user, for example, offers made by merchants within a 5 km radius of the user. The area to be specified and filtered is flexibly defined manually or automatically.

The payment vehicle data may also include terms and conditions of the payment vehicle, as shown in step 112. The user will be able to check all terms and conditions applicable on the payment vehicle, such as fees/charges for making transactions, and discounts or offers from financial institutes and merchants. As payment vehicle data for several payment vehicles may be retrieved in step 106, the user may easily compare fee/charges, discounts and offers among several payment vehicles. Therefore, it is not necessary to access each financial system to check terms and conditions of each payment vehicle, and partnerships and offers applicable to payment vehicles issued by particular issuers.

The terms and conditions may also be filtered based on the location. If the user is going for a business trip to a specific country, the user can obtain terms and conditions for the specific country. Filtering based on location information enables for the user to remain aware of discounts available for several payment vehicles in the specific location where the payment vehicles are intended to be used. Filtering based on location information also enables for the user to know which card is the most beneficial (e.g. lowest transaction fees) for particular purchases in specific locations.

The payment vehicle data may also include ancillary information, as shown in step 114. The ancillary information relates to usage of the payment vehicle for particular transactions relating to expenditure in reaching the geographical location and/or expenditure in the geographical location. The expenditure in reaching the geographical location includes expenditure for transportation, such as flights, travel insurance, and journeys on a train, ferry, bus, etc. The expenditure in the geographical location includes expenditures for the purpose of accommodation, food, entertainment, etc. In one example, the app or online portal may retrieve merchandising information from one or more merchants based on the location information of the user and show the merchandising information on the app or online portal. In another example, the app or online portal provides contact details of the user to merchants, as shown in step 120. The merchant may then send merchandising information to the user based on the location of the user or their intended location. The user may similarly be presented with the merchant's contact information or website. Thus, the App or the online portal works as a platform to provide targeted advertisements/offers to the user based on location, such as offers on hotels, restaurants, any tourist spots around the location, cab facilities, shopping places, etc.

The user may see the offer details provided by the merchants on the App. Alternatively, the user may be navigated to the merchants' portal/app if it is available. What is important is to exclude the terms and conditions or the ancillary information that is not applicable to the geographical location.

Step 110 involves displaying filtered payment vehicle data to user. The filtered data is displayed in a comparison chart for each payment vehicle relative to each other payment vehicle. The user may select criteria for comparison in the comparison chart. In response to the user selection, the displayed data may be updated. The filtered data may include a transaction cost to provide the user with general knowledge of the transaction cost for each card at a specific location. The filtered data may include a benefit attached to purchases of a particular item so that the user can easily identify the most appropriate payment vehicle to purchase the item in the geographical location. Furthermore, the filtered data may include a benefit attached to a transaction made with one or more specific merchants so that the user can easily identify the most appropriate payment vehicle to use for shopping at the one or more specific merchants.

In one example, the app or online portal may concurrently display data relating to two or more payment vehicles from systems of different financial institutes, at step 116, for comparison. Thus, the user can compare payment vehicles based on the offers and discounts from issuers and merchants as well as transaction fees and charges for use of those payment vehicles. The app or online portal may be open for other brand card holders as well so that the user can use the app or online portal as a one stop place for managing payment vehicle data on systems of financial institutes.

Optionally, the method 100 may further include a step 118 of updating information regarding usage for making particular types of transactions. For example, the user can select one or more payment vehicles from the comparison chart displayed in step 110 to enable or disable usage of the selected payment vehicle or vehicles for international transactions. Thus, the user can switch between enablement and disablement of international usage for each of the one or more payment vehicles based on the location information by using the App or online portal. If the user is travelling and International transactions are not enabled on a particular card, the App or online portal may grant access to the payment vehicle issuer system, through an API, to enable the payment vehicle for international usage based on the details provided by the user, such as country, time period of travel, etc.

Similarly, there is provided a facility to de-activate the payment vehicle for international transactions in the event the user does not want to use the payment vehicle internationally, and to prevent the payment vehicle from being used for fraudulent activity overseas. In such a situation, the user can disable international usage of the payment vehicle. Thus, it is not necessary to call or visit individual bank websites or contact individual financial institutions to enable or disable a payment vehicle for international transactions. The user can just select the card and the App will display the information from the financial institute and the user can manage the information from the financial institute within the App. The financial institute will enable or disable information from the App or online portal and may send acknowledgement to user for the same via SMS or email or message in the App.

Furthermore, the method 100 can be conducted for the purpose of expense management by the user. Expense management, especially lodging expense claims, is a common requirement for reimbursement of expenses incurred during business trips. However, locating and categorizing expenses for different countries and purposes are time-consuming tasks.

Credit card schemes and other payment networks are capable of recording location information (e.g. latitude and longitude) of merchants at which purchases are made. Since travel expenses can thus be linked to location information, retrieving and filtering payment vehicle data based on location information may comprise retrieving and filtering transaction information based on the recorded location information for each transaction. Thus transactions may be readily limited to particular locations to assist with reimbursement claims.

Alternatively, the method 100 can be conducted for the purpose of personal expense management. By using location information, the user can easily separate expenses incurred during holiday trips from expenses incurred during day-to-day usage of the payment vehicle. Generally speaking, the time at which transactions appear in a transaction history can depend on clearance timing. Transaction facilities (i.e. issuers and merchants) perform clearance activities at different times and thus transactions may not appear in the transaction history on the date on which the purchase took place. Since clearance timing may not correspond with actual transaction timing, it may be hard to identify the nature of expenses from transaction history. Therefore, filtering payment vehicle data based on location information is useful to identify the nature of transactions and to separate expenses incurred during holiday trips from those incurred on a daily basis.

In addition, the method 100 can be conducted for the purpose of corporate accounting or auditing. In most companies, several payment vehicles are used for payment transactions. Thus, the method 100 can be conducted through software installed on a computer or web based application provided by Software As A Service (SAAS) providers. Based on location information, payment vehicle data, such as travel expenses, may be categorized by location. Addition of location criteria may be useful for managing expenses for several payment vehicles.

Thus, the method may be conducted 1) before travel, 2) during travel, and 3) after travel. Accordingly, future locations may be used 1) before travel; current location may be used 2) during travel; and past locations can be used 3) after travel. Future location may refer to an intended location of use of the payment vehicle. Current location may refer to the location of the user. Past locations may refer to a location where the payment vehicle was used.

In one example, the method is conducted before travel for the purpose of planning travel. Based on future location information, merchandising offers in the area of travel will be provided to the user. Hotel information or travel insurance information may also be provided to the user.

In one example, the method is conducted during travel for the purpose of immediate use of the payment vehicle. Based on current location information, merchandising offers in the area of travel will be provided to the user without delay. After comparison of several payment vehicles, the most appropriate card for use for the specific transactions at the specific location can be provided to the user.

In one example, the method is conducted after travel for the purpose of reviewing travel expenses. Reviewing travel expenses may include identifying expenses incurred at different locations during travel. Based on past location information, payment vehicle data will be categorized for each location and may be provided to the user separately.

Figure 2:
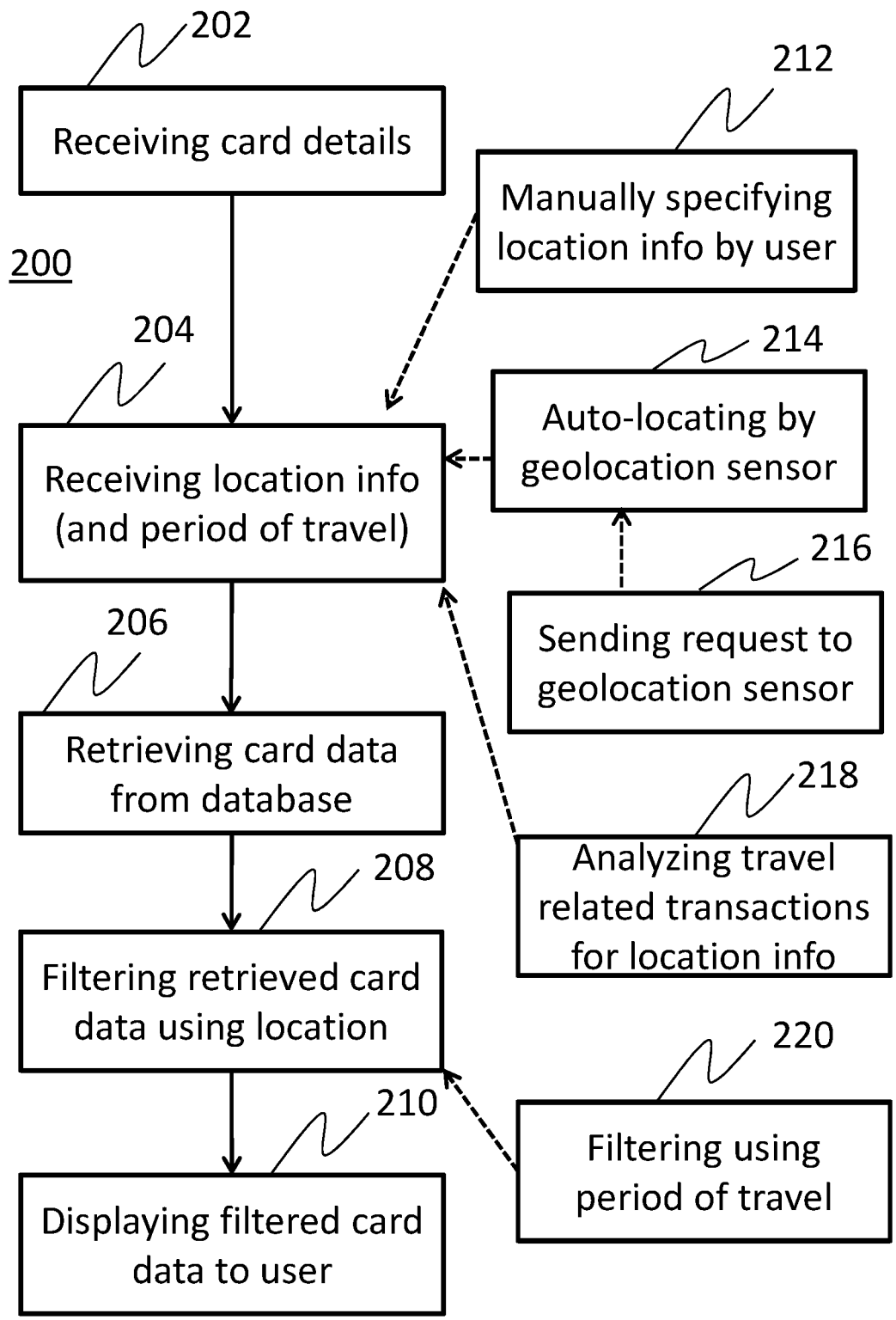
FIG. 2 shows a flow chart illustrating a method for managing payment vehicle data based on location information according to present teachings.

FIG. 2 shows a flow chart illustrating a method 200 for managing payment vehicle data based on location information, according to an embodiment of the disclosure. The method 200 also includes steps 202, 204, 206, 208 and 210 which are similar to steps 102, 104, 106, 108 and 110 of FIG. 1. There are several ways to receive location information. In one example, the location information is manually specified by a user, as shown in step 212. In another example, the location information is automatically obtained by a geolocation sensor as shown in step 214. Furthermore, the location information can be obtained from travel related transactions of payment vehicles, as shown in step 218.

Step 212 involves manually specifying location information by user. The user may submit location information by typing or selecting from pull-down menu in smart phone or any other type of computing device. The location information can be obtained from a microphone together with speech recognition software. Thus, the user can input any location information so that the user can obtain payment vehicle data specific to the location. The user can re-submit location information after obtaining the location specific payment vehicle data to refine the displayed data.

Step 214 involves automatically specifying location information by a geolocation sensor. A geolocation sensor, such as a GPS sensor embedded in a smart phone or another type of computing device, enables a user to obtain current location information. If the user is travelling in a specific country, the user can obtain payment vehicle data for the specific country without inputting location information because the geolocation sensor automatically obtains the location information. Also, the location information can be obtained from a base station or access point of a mobile telecommunication network. Alternatively, Step 214 includes sending a request to geolocation sensor, as shown in Step 216. In response to the request, the geolocation sensor will send back the location information.

The method 200 may include step 218 of analysing travel related transactions for location information. The relevant transactions made on a payment vehicle are obtained and analysed for location information. If the user makes a reservation for a flight to a specific country and makes payment using a payment vehicle, such a travel related transaction can be analysed to identify the location for use (e.g. through scanning an itinerary document or insurance policy document and using text recognition to identify locations of use and then to determine which of those locations are not normal locations of the user (e.g. in the vicinity of their residential address or in their home country)). As a result, the user will receive terms and conditions for use of the payment vehicle in the identified location. The user will also receive merchandising offers in the identified location. If the user is planning to go on a business trip, the user may receive offers for flights and hotels. If the user is planning to go on a personal trip, the user may receive offers for shopping or tourist spots around the identified location.

Alternatively, the step 204 of receiving location information is conducted after the step 206 of retrieving payment vehicle data from database. In that case, step 218 may include analysing travel related transactions made on the payment vehicle data retrieved in step 206. If the user purchased an article during a trip, the location where the user purchased the article is obtained by analysing a transaction history of the payment vehicle as retrieved from the database mentioned in step 218.

Optionally, step 208 of filtering retrieved card data using location may include filtering using the period of travel, as shown in step 220. In step 204, not only location information but also period of travel information may be received so that the user can obtain payment vehicle data generated in a specific location during a specific period. As information not relevant to the location and/or period is excluded, the user can focus on only relevant payment vehicle data. The period of travel can be obtained by manual input, in Step 212. Alternatively, the period of travel can be obtained by analysing travel related transactions, in Step 218. If the user purchases a return flight ticket, it suggests that the user is located in the area during the period between the departure date and return date. If the user makes a hotel reservation, it suggests that the user will be located in the area during the period of reservation for the hotel. By filtering payment vehicle data using period of travel, more relevant terms and conditions or merchandising offers can be delivered to the user.

Figure 3:
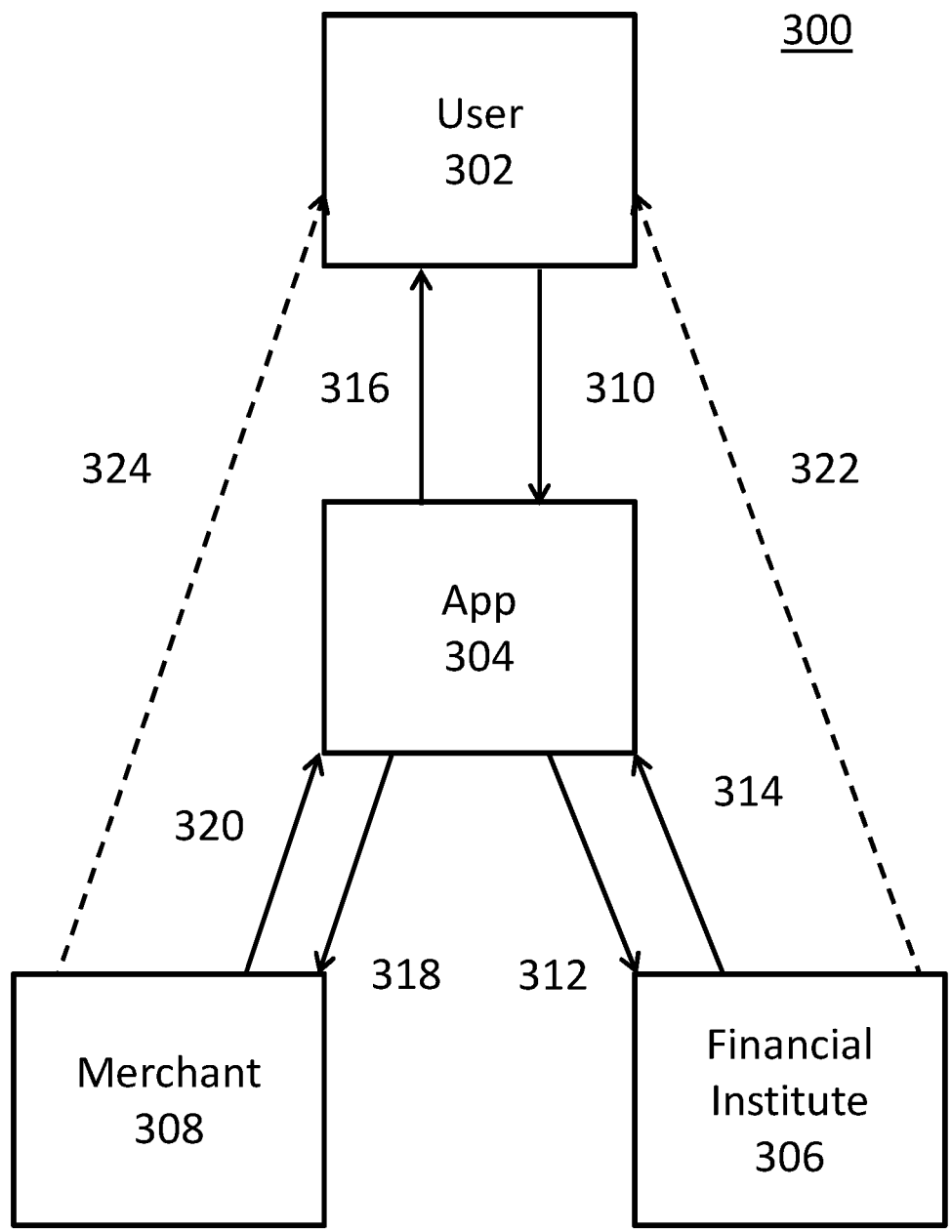
FIG. 3 shows a detailed workflow illustrating transactions between an app, financial institute and merchant, according to present teachings.

FIG. 3 shows a detailed workflow 300 illustrating transactions between user 302, App 304, financial institute 306 and Merchant 308, according to an embodiment of the disclosure. App 304 may be any type of intermediary means which interfaces with the user 302. Financial institute 306 may be one or more issuers or other financial institutes. Also, Merchant 308 may be one or more merchants.

In step 310, App 304 receives details of one or more payment vehicles from user 302. In addition to the details of payment vehicles, location information can be provided to the App 304 from the user 302. If the user 302 wishes to check or update payment vehicle data of financial institute 306, the user 302 may select one or more payment vehicles on the App 304 so that the App 304 can retrieve necessary information from the relevant financial institutes 306 in step 312. If the user 302 wishes to check merchandising information, the user may provide the App 304 with location information so that the App 304 can arrange merchandising information from Merchant 308. Alternatively, the App 304 may receive location information from financial institute 306 instead of the user 302 for arranging merchandising information or payment vehicle data from Merchant 308 or financial institute 306.

In step 312, App 304 requests financial institute 306 to provide App 304 with payment vehicle data via an API supported by financial institute 306. In response to the request 312, financial institute 306 will provide the App 304 with the payment vehicle data and the data will be forwarded to the User 302, at step 316. In this manner, the user can be made aware of whether international usage of the card is enabled or disabled. If the user wishes to activate/enable international usage of the card, the user can send an enablement request to the financial institute 306 via App 304 and receive confirmation from the financial institute 306. The User 302 may receive the confirmation directly from financial institute 306, at step 322, or via App 304, at step 314 and 316.

In step 318, App 304 requests Merchant 308 to provide App 304 with merchandising information. In response to the request 318, Merchant 308 will provide the App with the merchandising information and the information will be forwarded to the User 302, at step 316. Alternatively, the Merchant 308 directly sends merchandising information to User 302, at step 324, via email, SMS, or any other type of communication means. In step 318, the App 304 also provides the Merchant with location information of the User 302 so that the Merchant 308 can provide the User 302 with more appropriate information which the User 302 may wish to receive. As the App 304 will provide the Merchant 308 with relevant information after obtaining consent of the User, the Merchant 308 can provide targeted offers to the User 302.

After retrieving information from financial institute 306 and/or Merchant 308, at step 314 and/or 320, the App 304 may analyse the retrieved information so that the App 304 can provide information optimized for the User 302. As a result, the User 304 will have solid information about the charges and fees for card usage. Also, the User 304 can compare cards based on offers and discounts from financial institutes and merchants.

The App 304 may be installed on a mobile phone or tablet device. Alternatively, the App 304 may be an online portal accessible via a web browser on a computing device. The App 304 may have an interface for receiving information from the User 302 and, upon receipt, retrieves relevant information from financial institute 306 and/or Merchant 308 in a background process.

In the above procedures, location information can be forwarded from User 302 to App 304. App 304 may be configured to filter payment vehicle data retrieved from financial institute 306 and/or merchant 308 based on the location information. In addition, App 304 may be configured to filter payment vehicle data based on period of travel provided by user 302. The period of travel can be obtained by analysing travel related transactions which is available in financial institute 306.

In one example, user 302 may wish to manage travel expenses incurred on a payment vehicle after a business or personal trip. To obtain travel expenses for a specific business trip or personal trip, the user 302 sends payment vehicle attributes to App 304, at step 310. App 304 sends the payment vehicle attributes to Financial Institute 306, at step 312 and retrieves payment vehicle data from Financial Institute 306, at step 314. App 304 receives and analyses the payment vehicle data, such as transaction history, and obtains location information for each location at which the user made transactions. Based on the location information, App 304 filters the payment vehicle data to exclude data that does not relate to the location information. After filtering, App 304 displays the filtered payment vehicle data to user 302, at step 316.

Figure 4:
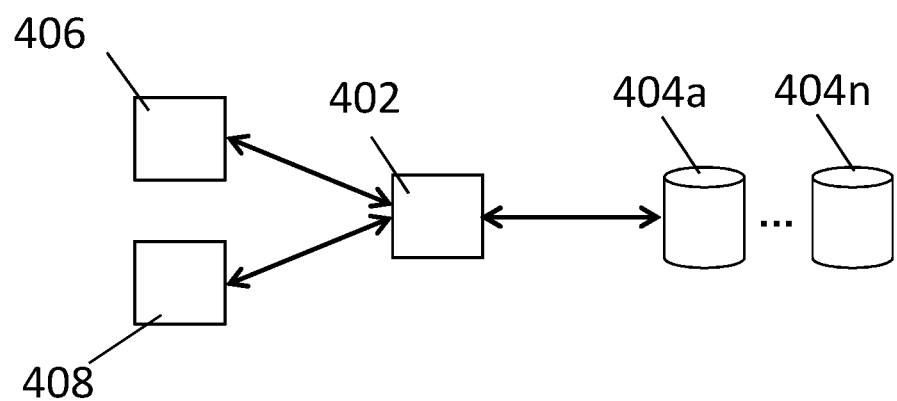
FIG. 4 shows a schematic of a system for managing payment vehicle data based on location information according to present teachings.

FIG. 4 shows a schematic of a network-based system 400 for managing payment vehicle data based on location information according to an embodiment of the disclosure. The system 400 comprises a computer 402, one or more databases 404a . . . 404n, a user input module 406 and a user output module 408. Each of the one or more databases 404a . . . 404n are communicatively coupled with the computer 402. The user input module 406 and a user output module 408 may be separate and distinct modules communicatively coupled with the computer 402. Alternatively, the user input module 406 and a user output module 408 may be integrated within a single mobile electronic device (e.g. a mobile phone, a tablet computer, etc.). The mobile electronic device may have appropriate communication modules for wireless communication with the computer 402 via existing communication protocols.

The computer 402 may comprise: at least one processor; and at least one memory including computer program code; the at least one memory and the computer program code configured to, with at least one processor, cause the computer at least to: (A) receive at least one payment vehicle attribute of at least one payment vehicle; (B) receive location information specifying a geographical location for use of the at least one payment vehicle; (C) retrieve payment vehicle data from one or more databases based on the at least one payment vehicle attribute; (D) filter the payment vehicle data using the location information, to exclude data that is not applicable to the geographical location; and (E) display the filtered payment vehicle data to the user.

The various types of data, e.g. payment vehicle data, ancillary information, location information, terms and conditions, preference of international usage, period of travel, can be stored on a single database (e.g. 404a), or stored in multiple databases (e.g. payment vehicle information are stored on database 404a, merchandising information are stored on database 404n, etc.). The databases 404a . . . 404n may be realized using cloud computing storage modules and/or dedicated servers communicatively coupled with the computer 402.

Figure 5:
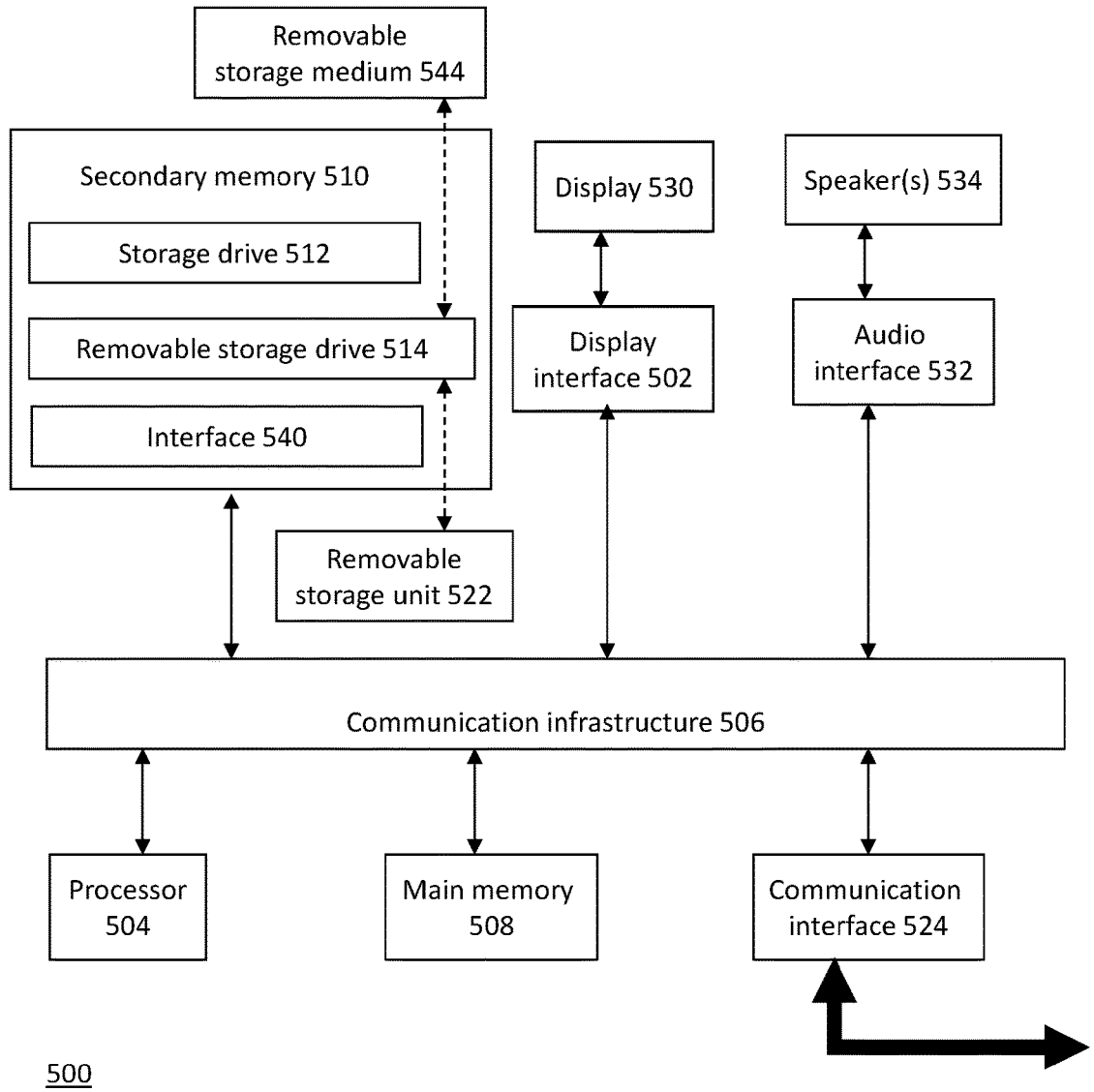
FIG. 5 shows an exemplary computing device suitable for executing the method for managing payment vehicle data based on location information according to present teachings.

FIG. 5 depicts an exemplary computer/computing device 500, hereinafter interchangeably referred to as a computer system 500, where one or more such computing devices 500 may be used to facilitate execution of the above-described method for managing payment vehicle data based on location information. In addition, one or more components of the computer system 500 may be used to realize the computer 402. The following description of the computing device 500 is provided by way of example only and is not intended to be limiting.

As shown in FIG. 5, the example computing device 500 includes a processor 504 for executing software routines. Although a single processor is shown for the sake of clarity, the computing device 500 may also include a multi-processor system. The processor 504 is connected to a communication infrastructure 506 for communication with other components of the computing device 500. The communication infrastructure 506 may include, for example, a communications bus, cross-bar, or network.

The computing device 500 further includes a main memory 508, such as a random access memory (RAM), and a secondary memory 510. The secondary memory 510 may include, for example, a storage drive 512, which may be a hard disk drive, a solid state drive or a hybrid drive and/or a removable storage drive 514, which may include a magnetic tape drive, an optical disk drive, a solid state storage drive (such as a USB flash drive, a flash memory device, a solid state drive or a memory card), or the like. The removable storage drive 514 reads from and/or writes to a removable storage medium 544 in a well-known manner. The removable storage medium 544 may include magnetic tape, optical disk, non-volatile memory storage medium, or the like, which is read by and written to by removable storage drive 514. As will be appreciated by persons skilled in the relevant art(s), the removable storage medium 544 includes a computer readable storage medium having stored therein computer executable program code instructions and/or data.

In an alternative implementation, the secondary memory 510 may additionally or alternatively include other similar means for allowing computer programs or other instructions to be loaded into the computing device 500. Such means can include, for example, a removable storage unit 522 and an interface 540. Examples of a removable storage unit 522 and interface 540 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 522 and interfaces 540 which allow software and data to be transferred from the removable storage unit 522 to the computer system 500.

The computing device 500 also includes at least one communication interface 524. The communication interface 524 allows software and data to be transferred between computing device 500 and external devices via a communication path 526. In various embodiments of the disclosures, the communication interface 524 permits data to be transferred between the computing device 500 and a data communication network, such as a public data or private data communication network. The communication interface 524 may be used to exchange data between different computing devices 500 which such computing devices 500 form part of an interconnected computer network. Examples of a communication interface 524 can include a modem, a network interface (such as an Ethernet card), a communication port (such as a serial, parallel, printer, GPIB, IEEE 1393, RJ35, USB), an antenna with associated circuitry and the like. The communication interface 524 may be wired or may be wireless. Software and data transferred via the communication interface 524 are in the form of signals which can be electronic, electromagnetic, optical or other signals capable of being received by communication interface 524. These signals are provided to the communication interface via the communication path 526.

As shown in FIG. 5, the computing device 500 further includes a display interface 502 which performs operations for rendering images to an associated display 530 and an audio interface 532 for performing operations for playing audio content via associated speaker(s) 534.

As used herein, the term "computer program product" may refer, in part, to removable storage medium 544, removable storage unit 522, a hard disk installed in storage drive 512, or a carrier wave carrying software over communication path 526 (wireless link or cable) to communication interface 524. Computer readable storage media refers to any non-transitory, non-volatile tangible storage medium that provides recorded instructions and/or data to the computing device 500 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a SD card and the like, whether or not such devices are internal or external of the computing device 500. Examples of transitory or non-tangible computer readable transmission media that may also participate in the provision of software, application programs, instructions and/or data to the computing device 400 include radio or infra-red transmission channels as well as a network connection to another computer or networked device, and the Internet or Intranets including e-mail transmissions and information recorded on Websites and the like.

The computer programs (also called computer program code) are stored in main memory 508 and/or secondary memory 510. Computer programs can also be received via the communication interface 524. Such computer programs, when executed, enable the computing device 500 to perform one or more features of embodiments discussed herein. In various embodiments, the computer programs, when executed, enable the processor 504 to perform features of the above-described embodiments. Accordingly, such computer programs represent controllers of the computer system 500.

Software may be stored in a computer program product and loaded into the computing device 500 using the removable storage drive 514, the storage drive 512, or the interface 540. Alternatively, the computer program product may be downloaded to the computer system 500 over the communications path 526. The software, when executed by the processor 504, causes the computing device 500 to perform functions of embodiments described herein.

It is to be understood that the embodiment of FIG. 5 is presented merely by way of example. Therefore, in some embodiments one or more features of the computing device 500 may be omitted. Also, in some embodiments, one or more features of the computing device 500 may be combined together. Additionally, in some embodiments, one or more features of the computing device 500 may be split into one or more component parts.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects to be illustrative and not restrictive.

With that said, it should be appreciated that one or more aspects of the present disclosure transform a general-purpose computing device into a special-purpose computing device when configured to perform the functions, methods, and/or processes described herein. In connection therewith, in various embodiments, computer-executable instructions may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for managing payment vehicle data based on location information, the method comprising:
   receiving, by a computing device, at least one payment vehicle attribute of at least one payment vehicle, the at least one payment vehicle including at least one card;
   receiving, by the computing device, location information from a geolocation sensor of a mobile device associated with a user, the location information specifying a geographical location for use of the at least one payment vehicle;
   retrieving, by the computing device, payment vehicle data from one or more databases based on the at least one payment vehicle attribute;
   filtering, by the computing device, the payment vehicle data using the location information, to exclude data that is not applicable to the geographical location; and
   displaying the filtered payment vehicle data to the user.

2. The method as claimed in claim 1, wherein the payment vehicle data comprises terms and conditions for usage of the at least one payment vehicle;
   wherein retrieving payment vehicle data includes retrieving the terms and conditions of the at least one payment vehicle; and
   wherein filtering the payment vehicle data includes filtering the terms and conditions using the location information, to exclude terms and conditions that are not applicable to the geographical location.

3. The method as claimed in claim 1, wherein the payment vehicle data comprises ancillary information related to usage of the at least one payment vehicle for particular transactions relating to expenditures in reaching the geographical location and/or expenditures in the geographical location;
   wherein retrieving payment vehicle data includes retrieving the ancillary information; and
   wherein filtering the payment vehicle data includes filtering the ancillary information using the location information, to exclude ancillary information that is not applicable to the geographical location.

4. The method as claimed in claim 1, wherein retrieving payment vehicle data comprises retrieving terms and conditions and ancillary information of the payment vehicle from the one or more databases; and
   wherein filtering the payment vehicle data comprises filtering the terms and conditions and ancillary information using the location information, to exclude terms and conditions and ancillary information that is not applicable to the geographical location.

5. The method as claimed in claim 1, wherein the at least one payment vehicle comprises a plurality of payment vehicles; and
wherein displaying the filtered payment vehicle data to the user comprises displaying the filtered payment vehicle data in a comparison chart, the comparison chart showing, for each payment vehicle relative to each other payment vehicle, at least one of:
a transaction cost;
a benefit attached to purchase of a particular item; and
a benefit attached to a transaction made with one or more specific merchants.

6. The method as claimed in claim 5, further comprising enabling or disabling usage of one or more payment vehicles, of the plurality of payment vehicles, for international transactions in response to a selection made for each of the one or more payment vehicles from the comparison chart.

7. The method as claimed in claim 1, further comprising providing, by the computing device, contact details of the user to one or more merchants to facilitate provision of offerings from the one or more merchants to the user.

8. The method as claimed in claim 1, wherein receiving location information comprises receiving location information in response to automatically sending a request for location information to the geolocation sensor.

9. The method as claimed in claim 1, further comprising receiving a period of travel to the geographical location; and
wherein filtering the payment vehicle data comprises filtering based on the geographical location and the period of travel, to exclude data that is not applicable to the period of travel.

10. A method for managing payment vehicle data based on location information, the method comprising:
receiving, by a computing device, at least one payment vehicle attribute of at least one payment vehicle, the at least one payment vehicle including at least one card;
retrieving, by the computing device, payment vehicle data from one or more databases based on the at least one payment vehicle attribute;
analyzing, by the computing device, the payment vehicle data to obtain location information specifying a geographical location used by the at least one payment vehicle;
filtering, by the computing device, the payment vehicle data using the location information, to exclude data that is not applicable to the geographical location; and
displaying the filtered payment vehicle data to a user.

11. A computing system for managing payment vehicle data based on location information, the computing system comprising:
a receiver for receiving at least one payment vehicle attribute of at least one payment vehicle, the at least one payment vehicle including at least one card;
a location information receiver for specifying a geographical location for use of the at least one payment vehicle;
a payment vehicle data manager for:
retrieving payment vehicle data from one or more databases based on at least one payment vehicle attribute; and
filtering the payment vehicle data using the location information, to exclude data that is not applicable to the geographical location; and
a display for displaying the filtered payment vehicle data to a user.

12. The computing system as claimed in claim 11, wherein the payment vehicle data comprises terms and conditions for usage of the at least one payment vehicle, and the payment vehicle data manager is further configured to retrieve the terms and conditions of the at least one payment vehicle from the one or more databases and filter the terms and conditions using the location information, to exclude terms and conditions that are not applicable to the geographical location.

13. The computing system as claimed in claim 11, wherein the payment vehicle data comprises ancillary information related to usage of the at least one payment vehicle for particular transactions relating to expenditures in reaching the geographical location and/or expenditures in the geographical location, and the payment vehicle data manager is further configured to retrieve the ancillary information from the one or more databases and filter the ancillary information using the location information, to exclude ancillary information that is not applicable to the geographical location.

14. The computing system as claimed in claim 11, wherein the payment vehicle data manager is further configured to provide contact details of the user to one or more merchants to facilitate provision of offerings from the one or more merchants to the user.

15. The computing system as claimed in claim 11, wherein the location information is manually specified by the user; and/or
wherein the location information is automatically obtained by a geolocation sensor.

16. The computing system as claimed in claim 15, further comprising the geolocation sensor, wherein the location information receiver receives location information in response to automatically sending a request for location information to the geolocation sensor.

17. The computing system as claimed in claim 11, wherein the location information is automatically obtained by analyzing one or more travel related transactions made using the one or more payment vehicles.

18. The computing system as claimed in claim 11, wherein the location information receiver receives location information and a period of travel to the geographical location; and
wherein the payment vehicle data manager is further configured to filter, based on the geographical location and the period of travel, to exclude data that is not applicable to the period of travel.

* * * * *